(No Model.)
W. S. ELLIOTT.
SOLDERING PLIERS.
No. 574,529.   Patented Jan. 5, 1897.
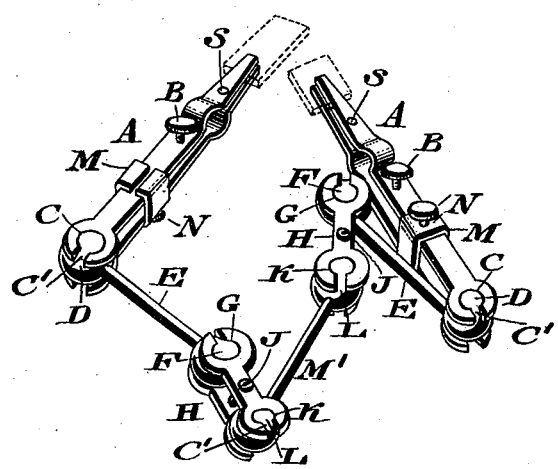
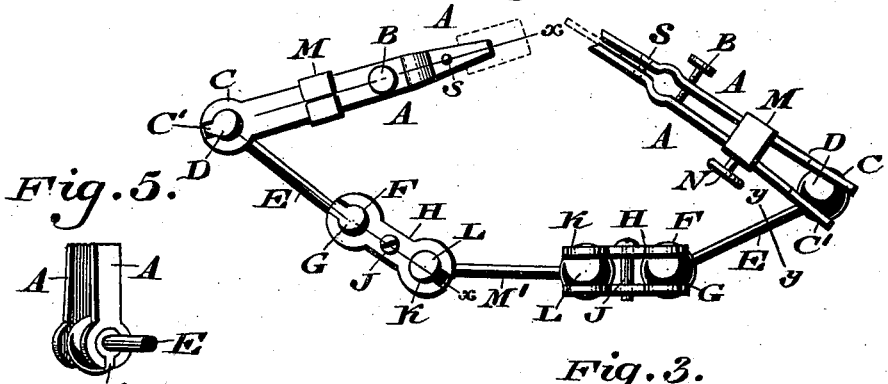
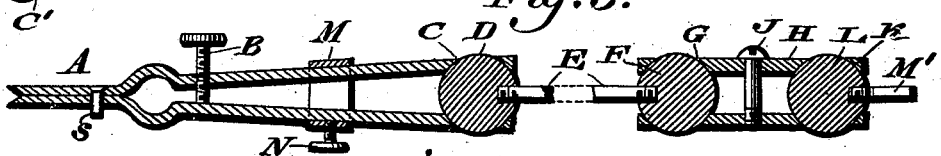
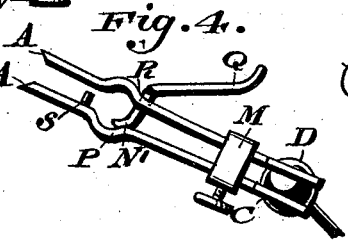
WITNESSES:
P. H. Hagler.
L. Douville.
INVENTOR
Walter S. Elliott,
BY John A. Wiederstein
ATTORNEY.

UNITED STATES PATENT OFFICE.

WALTER S. ELLIOTT, OF SAG HARBOR, NEW YORK, ASSIGNOR TO JAMES W. IVORY, OF PHILADELPHIA, PENNSYLVANIA.

SOLDERING-PLIERS.

SPECIFICATION forming part of Letters Patent No. 574,529, dated January 5, 1897.

Application filed December 2, 1895. Serial No. 570,773. (No model.)

*To all whom it may concern:*

Be it known that I, WALTER S. ELLIOTT, a citizen of the United States, residing at Sag Harbor, in the county of Suffolk, State of New York, have invented a new and useful Improvement in Soldering-Pliers, which improvement is fully set forth in the following specification and accompanying drawings.

My invention consists of a soldering-pliers formed of jaws and articulate carriers for the same which permit the jaws to be set at various angles.

It also consists of novel means for opening, closing, and guiding the jaws, as will be hereinafter fully set forth.

Figure 1 represents a perspective view of soldering-pliers embodying my invention. Fig. 2 represents a top or plan view thereof. Fig. 3 represents a central longitudinal section of a portion thereof, on an enlarged scale, on line $x\,x$, Fig. 2. Fig. 4 represents a side elevation of another form of my invention. Fig. 5 represents a section of a portion on line $y\,y$, Fig. 2.

Similar letters of reference indicate corresponding parts in the several figures.

Referring to the drawings, A designates two pairs of jaws formed of steel or other suitable elastic material, one member of each pair of jaws being provided with a screw B, which has a bearing with the other member thereof and is adapted when properly turned to separate or open the jaws. The inner ends of the pair of jaws are recessed, forming the sockets C C, in which are freely seated the balls D D, forming ball-and-socket joints.

E designates arms which carry at opposite ends the balls D D and the balls F F, the latter being seated in recesses G in the plates H H, which are joined by the screws J, said balls F and recesses G forming ball-and-socket joints.

In the ends of the plates H opposite to the balls G are recesses K, in which are seated the balls L L on the opposite ends of the arm M', said recesses K and balls L forming ball-and-socket joints.

On the jaws A rearward of the screws B are rings or slides M, which have the two-fold purpose of holding the jaws in apposition and adjusting the friction of the ball-and-socket joints, said slides when desired being provided with screws N, which bear against the jaws for imparting additional closing force thereto and also for additionally regulating or adjusting said friction.

In lieu of the screws B, I may use the cam or cam-head N', which bears against one of the jaws, as at P, and is connected with the lever Q, which is mounted on the other jaw, as at R, it being evident that by properly operating the lever Q said cam N' forces the jaws apart, as will be seen in Fig. 4.

In order to guide the working ends of the jaws one on the other, I employ the pin or stud S, which projects from one of the jaws and is adapted to enter an opening in the other jaw, thus guiding and steadying the parts and preventing lateral motion and strain thereon.

It will be seen that the jaws may readily grasp the article to be soldered or otherwise treated and that they may be set in various positions and at different angles to each other relatively to the nature of the work to be accomplished.

The plates H act as knuckles whose friction on the balls L in the sockets K in said plates may be adjusted by the screws J.

The walls of the sockets C have open slots C' therein, whereby the portions of the arms adjacent to the balls may enter said slots and thus give additional movement to the jaws, as shown in Fig. 5 and at the right side of Fig. 2.

Having thus described my invention, what I claim as new, and desire to secure by Letters Patent, is—

1. A soldering-pliers consisting of the spring-jaws A, the two sets of plates H, H, the arms E having ball-and-socket connections with said plates, and jaws, and the arm M' having ball-and-socket connection with both of said sets of plates H, said parts being combined substantially as described.

2. A soldering-pliers having spring-jaws at its opposite ends provided with slides on their rear ends, a set of plates connected with each of said jaws by a rod having a ball-and-socket joint at each of its ends and a rigid arm connecting by ball-and-socket joints said sets of plates.

3. A soldering-pliers having a jaw consisting of two spring-plates with recesses in the inner end of each, slides embracing said plates, means connected with said plates for opening the same, and a pin on one of said plates for guiding the movements of both, said parts being combined substantially as described.

4. A soldering-pliers having a central arm, plates having ball-and-socket connections with the ends of said arm, jaws, and arms having ball-and-socket connections with said jaws and plates, said parts being combined, substantially as described.

WALTER S. ELLIOTT.

Witnesses:
WM. C. GREENE,
EDWIN WINTERS.